United States Patent [19]
Parker

[11] Patent Number: 5,946,742
[45] Date of Patent: Sep. 7, 1999

[54] TRUCK URINE RESERVOIR

[76] Inventor: Jerry Paul Parker, 167 Sutton La., Newberry, S.C. 29108

[21] Appl. No.: 09/115,861

[22] Filed: Jul. 15, 1998

[51] Int. Cl.⁶ .................................................. B60R 15/04
[52] U.S. Cl. ..................................................... 4/458
[58] Field of Search ..................................... 4/458, 114.1

[56] References Cited

U.S. PATENT DOCUMENTS

| | | |
|---|---|---|
| 1,727,199 | 9/1929 | Freitag . |
| 3,070,810 | 1/1963 | Jones ........................................... 4/458 |
| 3,882,799 | 5/1975 | Sargent et al. ........................... 110/9 R |
| 4,042,981 | 8/1977 | Cook ............................................. 4/10 |
| 4,785,483 | 11/1988 | Wise ........................................... 4/321 |
| 5,117,511 | 6/1992 | Smith ....................................... 4/114.1 |
| 5,285,532 | 2/1994 | Sealy ........................................ 4/144.3 |

*Primary Examiner*—Charles E. Phillips
*Attorney, Agent, or Firm*—Joseph N. Breaux

[57] ABSTRACT

A urine reservoir is provided for a truck allowing a trucker to utilize the urine reservoir while underway and/or without having to detour from a highway while traveling thereby saving precious travel time and greatly increasing the efficiency of a trucker. The urine reservoir includes a holding tank with a fill system which includes a fill tube with an in-line carbonatious filter which helps eliminate foul odors from entering into the truck cab. The holding tank is positioned and mounted on the truck for quick and easy removal by use of wing nuts and a quick release fill tube disconnecting member. The level of the holding tank is monitored by a float mechanism which audibly and/or visually indicates to the trucker when the urine holding tank should be emptied. The holding tank also includes a deodorant dispensing device which either automatically or manually releases deodorant into an interior of the holding tank helping to prevent foul odors from emanating from the holding tank.

3 Claims, 3 Drawing Sheets

TRUCK URINE RESERVOIR

TECHNICAL FIELD

The present invention relates to devices and methods for urine reservoirs and more particularly to a mobile truck urine reservoir which includes an easy to remove and empty urine holding tank, a filling system which is comprised of a filling tube with a quick disconnect from the holding tank and further quick disconnect men's and women's adapter, a fluid level monitor and a tank level audible and visual indicator mounted in the driver's cab of the truck while noxious odors are reduced by an in-line carbonatious filter located in the filling tube and a deodorant dispensing device which dispenses deodorant into the holding tank.

BACKGROUND ART

Long haul truckers have always experienced the problem of finding time and a location to relieve themselves while traveling on the road. Bathroom stops cut into a truckers valuable time and decrease the trucker's efficiency and increase travel time. The inventor has found that this problem can be overcome by the use of the present invention. Additionally, the inventor has found that the use of the urine reservoir with its portable holding tank which quickly and easily disconnects from a filling tube, and with a urine level monitoring system, and the filling tube adapters which allows the reservoir to be used by either a female or male trucker provide a device which greatly enhances the efficiency of a trucker. Prior art consists of the following patents:

Sealy, U.S. Pat. No. 5,285,532 which discloses a portable urine device.

Smith, U.S. Pat. No. 5,117,511 which discloses a liquid disposable automotive accessory.

Wise, U.S. Pat. No. 4,785,483 which discloses an integrated passenger seat and toilet apparatus and method.

Cook, U.S. Pat. No. 4,042,981 which discloses a toilet waste holding apparatus.

Sargent, et al, U.S. Pat. No. 3,882,799 which discloses a waste disposal system and method.

Avila, U.S. Pat. No. 1,905,881 which discloses and automotive commode.

Freitag, U.S. Pat. No. 1,722,199 which discloses an attachment for automobiles.

Randle, U.S. Pat. No. 1,650,155 which discloses an automobile commode.

As can be seen from the prior art there has never been a device as the present which solves the problem of providing a trucker with a convenient on board urine reservoir which is easy to empty and includes a urine level monitoring system, a carbonatious filter for removing noxious odors which may emanate from the holding tank, a deodorant dispensing device which further helps eliminate odors from the holding tank, an audible and visual urine level tank indicator mounted within the truck cab, and further includes a filling tube with quick disconnect at the holding tank and quick disconnect men's and women's adapter allowing the urine reservoir to be utilized by either a man or woman trucker.

GENERAL SUMMARY DISCUSSION OF INVENTION

It is thus an object of the invention to provide a Truck Urine Reservoir that increases the efficiency of a trucker by allowing a trucker to utilize the onboard urine reservoir without having to make intermittent stops thereby increasing the trucker's efficiency and decreasing the trucker's time on the road.

It is a further object of the invention to provide a Truck Urine Reservoir that includes a holding tank with a quick disconnect filling tube which allows the urine reservoir to be easily removed and emptied by the trucker.

It is a still further object of the invention to provide a Truck Urine Reservoir that includes an in-line carbonatious filter in-line with a filling tube which helps prevent noxious odors from emanating from the ho lding tank through the filling tube, and further includes a deodorant dispensing unit contained on a top portion of the holding tank which dispenses deodorant into the holding tank and thereby helps reduce noxious odors from emanating from the holding tank.

It is a further object of the invention to provide a Truck Urine Reservoir that includes a fluid level indicating mechanism which is comprised of a float mechanism positioned within a holding tank with a magnetically actuated float fluid level indicator which sends an electrical signal to an audio and visual fluid level indicator mounted within the truck cab so that the trucker can visually and/or audibly monitor the tanks level and empty the tank when necessary.

It is a still further object of the invention to provide a Truck Urine Reservoir that is easily converted for use by a male or female by the use of a quick disconnect mens adaptor and a quick disconnect women's adaptor on a filling tube which is positioned within a convenient location within the truck's cab and/or sleeper area.

Accordingly, a Truck Urine Reservoir is provided which comprises a holding tank that is detachably connected to the truck thereby allowing for easy removal and emptying and cleansing of the holding tank, a holding tank level monitoring system which comprises a float mechanism mounted on a guide rod wherein the guide rod has a magnetically actuated switch positioned thereon and the float has a magnet mounted thereon in a manner such that when a predetermined float level is achieved the magnetically actuated switch is closed activating an audible and/or visual alarm to alert the trucker that the tank must be emptied, a fill system comprising a quick disconnect fill tube disconnectable at the holding tank with a receiving end positioned within the trucks cab or other convenient location for the trucker further comprising a quick disconnect mens adaptor or women's adapter mounted on the receiving end of the fill tube, further comprising a in-line carbonatious odor capturing filter positioned on the holding tank in-line with the fill tube for illuminating odors which may emanate from the holding tank through the fill tube, a deodorant dispensing device mounted on a top portion of the holding tank providing a constant releasable deodorant composition to be slowly released into the holding tank thereby helping eliminate odors within the holding tank.

BRIEF DESCRIPTION OF DRAWING

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that in use a trucker would mount the truck urine reservoir inside a tool box or along the floor board of his or her tractor trailer rig using supplied brackets which are provided with the urine reservoir and utilizing quick release wing nuts provided with the urine reservoir. Next the trucker would attach the filling hose, the wiring for the holding tank level, and the appropriate male or female adaptor. Should the trucker need to relieve him or herself while driving he or she would relieve his or herself inside the adaptor, allowing the filling hose to deliver the urine into the urine reservoir holding tank. A carbonatious filter mounted inside the filling hose would aid an illuminating odor that may travel up from the holding tank before disposal of the holding tank contents. As the holding tank fills, an expanded plastic foam flat surrounding a slide tube would rise with the level of the urine inside. Once the float has reached the top of the slide tube, a magnet mounted inside the float would make contact with a magnetic switch inside the slide tube, completing an electrical connection and sending an electrical signal to an audible and/or visual tank level indicator mounted inside the truck cab warning the trucker that the holding tank needs to be emptied. To empty the tank the trucker would remove the filling tube utilizing a quick disconnect tubing connector from the top of the holding tank, unfasten the wing nuts from the brackets holding the tank to the truck, remove the holding tank, transport the holding tank to an appropriate location to drain the urine and then open a ball valve on a lower portion of the holding tank allowing the contents of the holding tank to be emptied. At this point the trucker may also visually inspect the deodorant dispensing device mounted on top of the holding tank assuring that sufficient deodorant compound is in the deodorant container. After emptying the trucker would replace the holding tank and connect the filling tube, and the electrical wiring for the level indicating device for further use.

Figure 1:
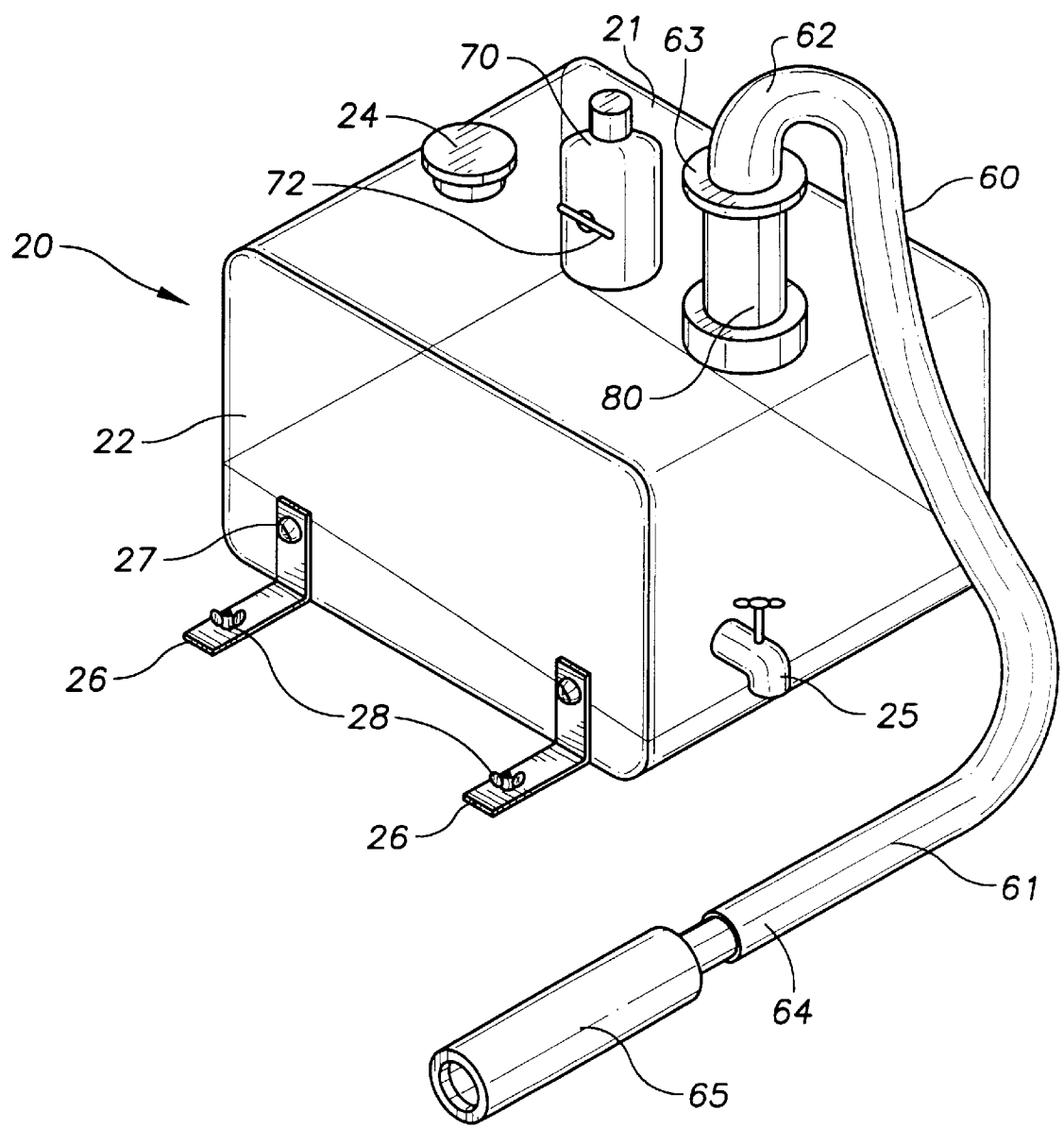
FIG. 1 is an isometric view illustrating the holding tank, fill tube, deodorant dispensing device, and other components of the truck urine reservoir.
Figure 2:
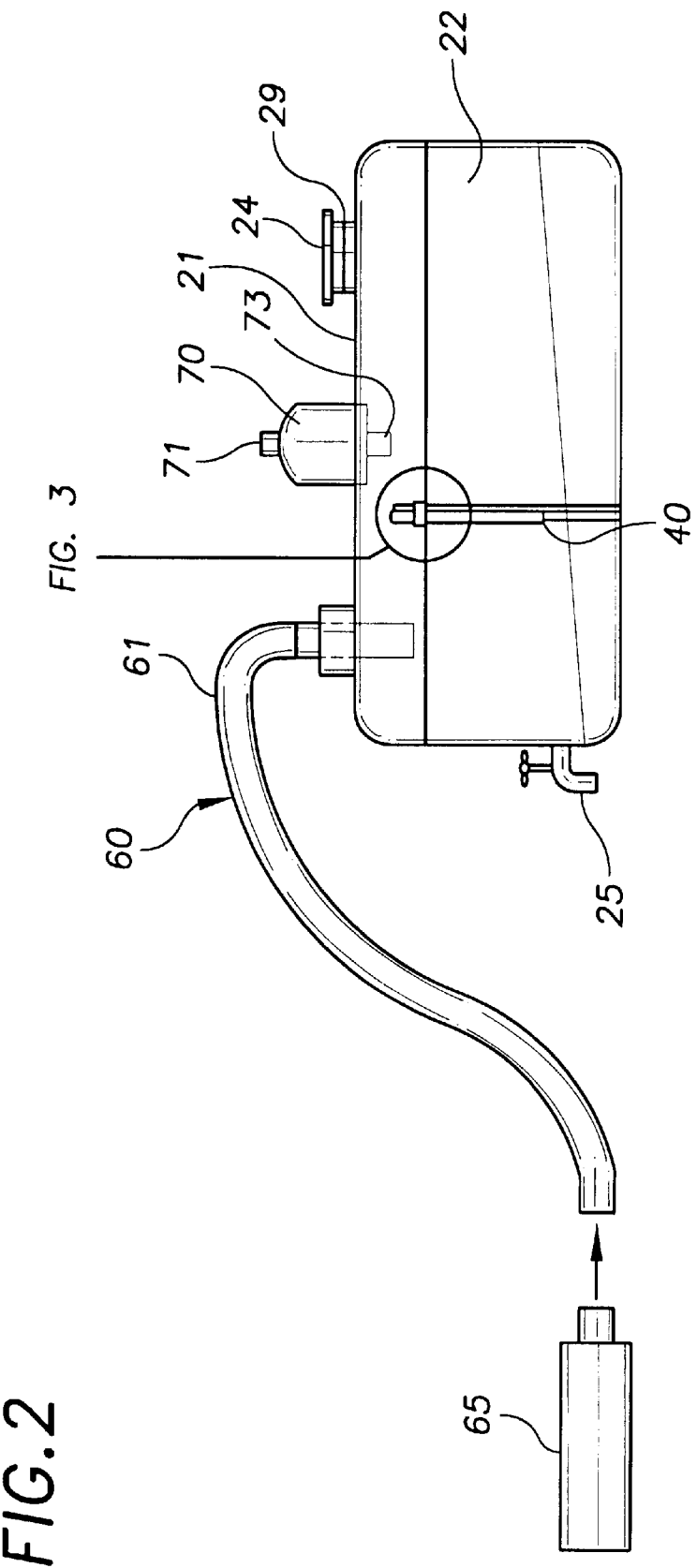
FIG. 2 is a side view of the truck urine reservoir illustrating in further detail the holding tank level monitoring mechanism and other components of the urine reservoir.
Figure 3:
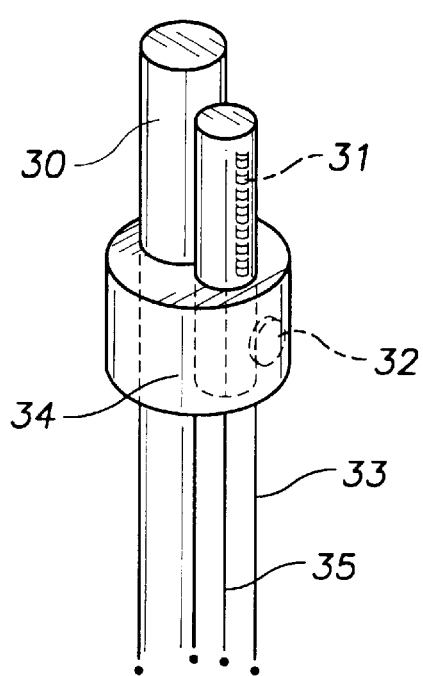
FIG. 3 is a close up isolated view of the magnetic actuated switch indicated as "I" on FIG. 2 on the holding tank level monitoring mechanism in the holding tank.
Figure 4:
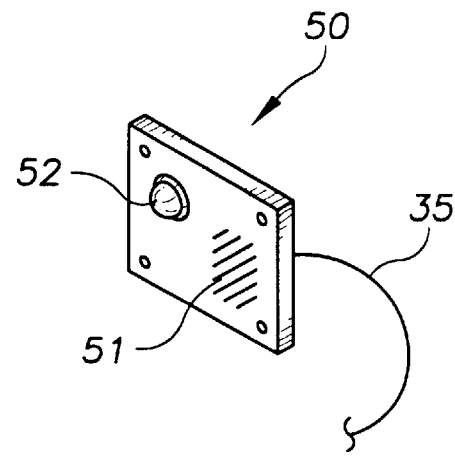
FIG. 4 is an isolated view of the audible and/or visual indicator which is mounted within the truck's cab.
Figure 5:
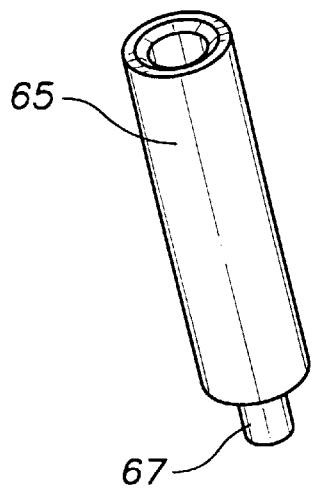
FIG. 5 is an isolated view of the mens adaptor.
Figure 6:
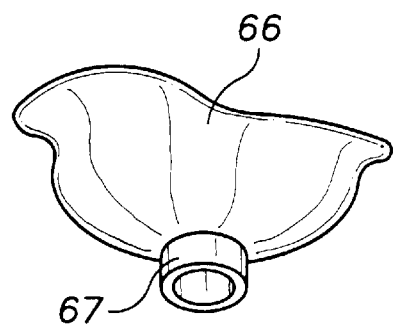
FIG. 6 is a isolated view of the women's adaptor.

Referring to the figures in detail FIG. 1 is an isometric view of the holding tank 20 illustrating the major component parts of the urine reservoir which include the filling system 60, a deodorizing canister 70, ball valve 25, holding tank mounting brackets 26, holding tank inspection cap 24, while FIG. 2 illustrates the placement of the level indicating mechanism 30.

Holding tank 20 is preferably constructed of polyethylene, ABS plastic, or any other appropriate polymer which is suitable for containing urine. Additionally, the material used to manufacture the holding tank 20 is preferably translucent so that a trucker may be able to glance at the holding tank 20 and determine the level of urine contained within without having to rely upon the fluid level devices described herein. Mounting brackets 26 are "L" shaped brackets and may be molded of continuous material with the holding tank 20 or may be constructed as separate metal "L" shaped brackets attached by screws 27 to the holding tank side. Wing nuts 28 are used to secure the holding tank 20 to a floor of the truck floorboard or tool box or other appropriated flat location within the truck and further provide a quick release device allowing the user to quickly remove the storage tank 20 for emptying. The holding tank 20 is preferably about twelve inches in height, twenty inches in length, and twelve inches in width. This dimension allows the device to be placed easily within a truck tool box or other location within a truck. A ball valve 25 is positioned on an end or side of the holding tank 20 and preferably is located near a bottom portion of the holding tank to allow all of the contents of the holding tank to be released when the ball valve is opened without having to tilt the holding tank. Clean out cap 24 is positioned on a top surface 21 of the storage tank and is a round "bungee" type cap threadably secured to a female threaded portion 29 of the holding tank 20. The clean out cap 24 further has a diameter of about three to four inches allowing visual inspection of the interior of the tank if necessary. Additionally, the dimension of the inspection cap 24 allows a user, if necessary to insert tools and/or a hand to work on the interior components of the holding tank is necessary.

The holding tank 20 also includes a level indicating mechanism 30 which indicating system is contained within an interior 22 of the holding tank 20 the mechanism system 30 is further comprised of a magnetic read switch 31, a magnet 32, a slide tube 33, an expanded plastic foam float 34, and wiring 35. The magnetic read switch 31 is fixedly secured to a top portion of the slide tube 33 while the magnet 32 is attached to the float 34, which is shaped as a donut to fit around the slide tube 33, so that as urine fills the holding tank 20, the float 34 travels up the slide tube 33 and when the magnet 32 contacts the magnetic read switch 31 the wiring 35 sends an electrical signal to an audio visual tank level indicator 50 which is installed in the truck cab in a convenient location. Furthermore, the wiring 35 includes a quick disconnect for quickly disconnecting the level indicating mechanism 30 when the tank is to be removed from the truck and emptied. The audio visual tank level indicator 50 includes an audio speaker 51 which signals an alarm when the tank reaches a filled level. The audio/visual tank level indicator 50 also includes a visual red indicating warning light 52 which is illuminated when the level in the holding tank 20 reaches a full level. The level indicating mechanism 30 functions so that when a predetermined float level is achieved, the magnetic switch 31 is closed activating the audio/visual tank level indicator 50 to alert the user that the tank must be emptied.

The filling system 60 is comprised of a filling tube 61 which includes a holding tank connecting end 62 which is connected to a top portion 21 of the holding tank. The holding tank connecting end 62 also includes a quick disconnect 63 which allows the trucker to quickly disconnect the tubing 61 at the connection of the holding tank 20 so that the holding tank can be carried away from the truck without the filling tube 60 dangling or causing any other obstruction. The filling tube 61 also includes a receiving end 64 which has a specially adapted end for quick release of urine receiving adapter which is either a men's adaptor 65 or a women's adaptor 66. Both the mens 65 and womens 66 urine receiving adapters include a connecting portion 67 which are identical, which allows the mens and womens adapters to be attached easily and quickly to the receiving end 64 of the fill tube 61. The mens and womens adapters 65 and 66 are preferably constructed of supple rubber material such as NEOPRENE™ providing for comfort when engaging the adapters to the genital areas of the user for operation of the device. Additionally, fill tube 60 is constructed of a flexible plastic material which provides flexibility of the tubing 61 without causing cracking or other destructive problems with the fill tube 61. The fill tube is also of sufficient length to allow the receiving end of the tube to be placed in an interior of the truck cab in a convenient location.

A deodorizing canister 70 is positioned on a top portion 21 of the holding tank 20. The deodorizing canister 70 includes a fill cap 71, a deodorant release valve 72 which allows a trucker to selectively release deodorant into an interior 22 of the holding tank 20 when more deodorant may be need to neutralize odors. The deodorant canister 70 includes a dispensing port 73 which dispenses the deodorant compound into the interior 22 of the holding tank 20. The deodorant canister fill cap 71 allows the user to easily fill the deodorant canister with any desired perfume and/or deodorant compound. The deodorant canister 70 also allows a user to selectively add more or less quantities of deodorant into the interior 22 of the holding tank 20 as desired and/or needed. The deodorant functions to eliminate and/or reduce foul odors emanating from the holding tank 20.

An in-line carbonatious filter 80 is provided in-line with the fill tube 61 and located at the holding tank end of the fill tube 62. The carbonatious filter 80 is accessible after the quick release 63 as utilized for removing the holding tank end 62 of the fill tube 61. The carbonatious filter 80 provides a deodorizing filter which helps illuminate odors from traveling the interior of the holding tank 22 through the fill tube 61 and into the truck cab where the fill end 64 of the tubing 61 may rest.

It is noted that the embodiment of the Mobile Truck Urine Reservoir described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Truck Urine Reservoir comprising:
   a) a holding tank constructed in the general shape of a rectangle and further comprising a female threaded clean out port positioned on a top surface of the holding tank, a ball valve positioned on a side and near a bottom surface of the holding tank for emptying the contents of the holding tank, mounting brackets positioned on at least two sides of the holding tank and near the bottom surface providing a means for mounting the holding tank in a truck,
   b) a holding tank level indicating mechanism mounted within an interior of the holding tank and further comprising a slide tube mounted vertically within the interior of the holding tank, a magnetic read switch attached to a top portion of the slide tube, donut shaped float positioned around the slide tube, a magnet attached to the float and further wherein the magnetic read switch is positioned on the slide tube so that as urine fills the interior of the holding tank the float travels up the slide tube and when the tank is about full the magnet on the float contacts the magnetic read switch,
   c) an audible and visual level indicator mounted in an interior of a truck cab and further comprising a audible speaker and a light electrically connected to the magnetic read switch and which are activated when the holding tank is about full,
   d) a filling mechanism providing a means for a user to urinate into the urine reservoir comprising a fill tube which is releasable connected to a top portion of the holding tank, a male and female urine receiving adapter for attaching to a receiving end of the fill tube allowing the fill tube to be utilized by either a man or women by changing the urine receiving adapted, a quick release fill tube connector allowing the fill tube to be quickly connected and disconnected form the holding tank, an in-line carbon filter placed between the quick disconnect and holding tank and in-line with the urine the enters the holding tank providing a means for reducing noxious odors from emanating from the holding tank,
   e) a deodorant canister attached to a top portion of the holding tank and which canister further comprises a filling cap for installing deodorant compound into an interior of the canister, and a deodorant valve for manually draining deodorant from the interior of the deodorant canister to an interior of the holding tank.

2. The Truck Urine Reservoir of claim 1, wherein the holding tank further comprises a holding tank constructed of translucent plastic material allowing a user to visually inspect the holding tank and determine the level of urine contained within the interior of the holding tank.

3. The Truck Urine Reservoir of claim 1, wherein the audible and visual level indicators further comprise an audible buzzer which is activated when the holding tank is about full and a red indicating light which is illuminated when the holding tank is about full.

* * * * *